June 27, 1933.  E. Z. WAINWRIGHT, JR  1,915,563
AUTOMOBILE KEY
Filed Aug. 17, 1932
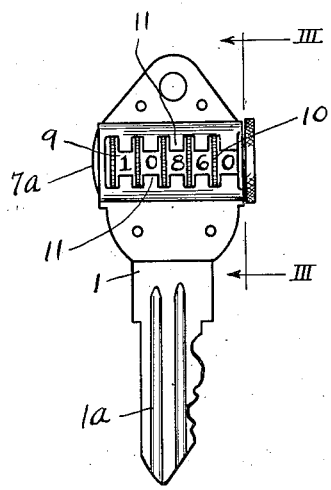
Fig. I
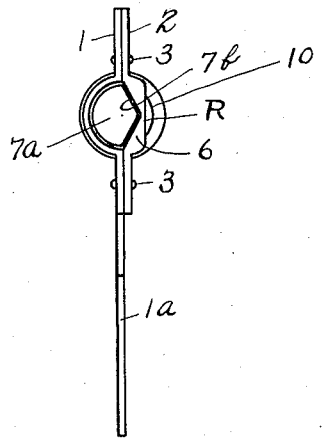
Fig. II
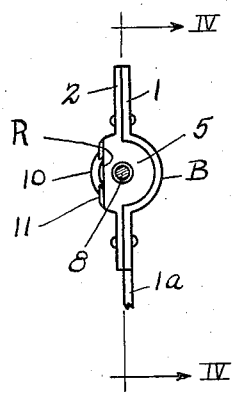
Fig. III
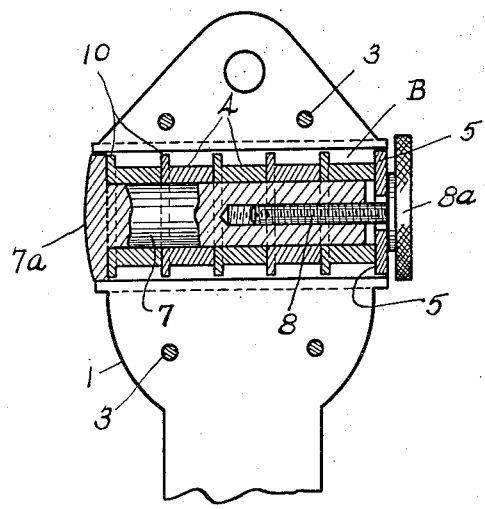
Fig. IV
INVENTOR
Edwey Z. Wainwright Jr.
by Christy Christy and Wharton
his attorneys Patented June 27, 1933

1,915,563

UNITED STATES PATENT OFFICE

EDWEY Z. WAINWRIGHT, JR., OF PITTSBURGH, PENNSYLVANIA; IDA R. BRATTON (FORMERLY IDA R. WAINWRIGHT) EXECUTRIX OF SAID EDWEY Z. WAINWRIGHT, DECEASED

AUTOMOBILE KEY

Application filed August 17, 1932. Serial No. 629,138.

My invention relates to a key for an automobile lock, say the ignition lock, and consists in the particularly effective and trim organization of an adjustable index in the head of the key.

I am aware that, hitherto, adjustable index devices have been provided, to indicate to the operator of a motor car the mileage or speedometer reading at which the car should have its store of lubricant supplemented or renewed. Devices for this general purpose have proven to be of utility and value to car operators, but the cost and the necessity of installing additional equipment in the motor cars have impeded their general adoption. The object of my invention is to provide a device of this nature which, because of its more economical construction, is within the reach of all. A further object of my invention is to provide an adjustable index which is of such structure that it can be advantageously incorporated with the ignition key of an automobile. In providing an index structure which can be incorporated in the ignition key of an automobile, I dispense with the need of a separate or independent index installation in the car. Additionally, the index lends weight and distinctive appearance to the ignition key itself, and saves the car operator from fumbling and searching through the keys grouped, according to usual practice, upon a key ring or within a key case, to single out the ignition key.

A key embodying the invention is shown in the accompanying drawing, in which Fig. I is a view of the key in front elevation; Fig. II is a view of the key in side elevation, taken at a point of view to the left of Fig. I; Fig. III is a fragmentary view, taken on the plane III—III, Fig. I; and Fig. IV is a view in cross-section, taken on the plane IV—IV of Fig. III. In Figs. I–III the drawing shows the key to be larger than the usual automobile ignition key, and, for convenience in observation, Fig. IV is drawn to still larger scale.

My key comprises two metal body members 1 and 2; the key portion 1a of the structure is integrated with the metal body 1, and the two body portions 1 and 2 are riveted (3), spot-welded, or otherwise united to form the head portion of the key structure. The metal bodies are sheared and stamped from sheet metal, or are otherwise produced in machines and by methods well known in the metal-working art. Each metal body is outwardly bellied, so that in assembly the two bodies provide a chamber or barrel B, within which barrel index wheels 4 are mounted. The body member 2 includes, additionally, at each end of its bellied portion, wall members 5 and 6, and in the assembled structure the members 5 and 6 extend transversely of the barrel at its respective ends.

The index wheels 4 are mounted in series upon a stem 7; the several wheels 4 are rotatable upon the stem and are in lateral abutment, one with another. The stem 7 extends axially of the barrel B, and has integrated with it a shoulder, against which shoulder the wheel 4 at one end of the series bears. In the illustrated embodiment, the shoulder is in structure a head 7a; in cross-section the head 7a is flattened or otherwise shaped at 7b, and the end wall 6 of body member 2 is of such complementary shape (Fig. II) that engagement between head 7a and end wall 6 prevents rotation of the stem 7, but admits of its axial movement.

I have mentioned that the index wheel at one end of the series abuts the shoulder (head 7a) on the stem 7, and I now direct attention to Fig. IV, wherein it will be observed that the wheel 4 at the opposite end of the series abuts the end wall 5. The stem 7 is internally bored and threaded, and a thumb screw 8 extends into such bore. The head 8a of the screw 8 is located against the external face of end wall 5; the stem 7 is shorter than the aggregate length of the index wheels 4 (cf. Fig. IV), so that the series of wheels 4 can be pressed together laterally between the fixed end wall or stop 5 and the shoulder (7a) on the movable stem 7.

Each index wheel bears numerals running from zero to nine upon its cylindrical side face. And a window 9 is formed in one of the key body members—in this case the window 9 is formed in the body member 2. As will presently appear, the wheels 4 may be each so adjusted that the desired one of its numerals is located in registry with the window 9. Accordingly, the series of wheels 4 may be adjusted to read any desired number within the range of numerals possible, as determined by the number of wheels 4. For example, the illustrated key has five index wheels, thus making it possible to organize the wheels to reveal in the window 9 any number from 00000 to 99999.

To set the index wheels, the thumb screw 8 is turned counterclockwise (Fig. III), and, since the engagement between head 7a and the wall 6 (Fig. II) prevents the stem 7 from rotating, such adjustment of the screw 8 is effective to shift stem 7 to the left (Fig. IV). Thus the interval between the head or shoulder 7a and the stop wall 5 is increased, and the index wheels are freed for rotary adjustment. When the wheels have been severally adjusted to present the desired reading or aggregate numeral within the window 9, the thumb screw is rotated clockwise (Fig. III), drawing the stem to the right (Fig. IV) and tightly locking the wheels in the manner above described.

I have discovered that after the index wheels have been adjusted and are ready to be locked in place, it is difficult to prevent them (index wheels) from being jostled out of adjustment, particularly while the thumb screw is being turned up. To overcome this condition, I secure the stem against rotation, as explained, and, even when the screw 8 is being rotated, there is only linear movement imparted to the stem 7. I provide other means to prevent unintended movement and disarrangement of the index wheels. That is, I so proportion the parts that the head 7a projects laterally a slight interval from the barrel in which the wheels 4 are mounted. The projection of the head 7a can be observed in Fig. IV. When the person adjusting the index wheels has reached the desired "setting", he presses upon the head 7a with the thumb of his one hand, and tightens the screw 8 with his other hand. Thus, thumb pressure applied axially upon the head 7a temporarily serves to secure the wheels 4 in position of adjustment, while the thumb screw is being turned home to secure such parts until a new adjustment of the index wheels is desired.

Due to the relatively small dimensions of the usual automobile keys, I found it a problem to provide in the key an index structure in which the essentially small index wheels may be readily manipulated for adjustment. In solving such problem I provide a peripheral, outstanding rib 10 on each wheel. The edges of the ribs are serrated or knurled, and the ribs extend outward of the barrel B, to the end that the index wheels can be adjusted by engagement of the finger severally upon the ribs. The provision of the ribs 10 alone does not admit of the desired ease of adjustment. Other features of my structure are essential to the ready manipulation of the ribs 10 and their associated wheels 4. That is to say, in small sizes of index wheels (4), and necessarily the index wheels are small in my key structure, the exposed arcuate extent of the ribs 10 must be relatively great, otherwise the ribs are not sufficiently accessible for manipulation by the human finger. It is characteristic of my structure that ample portions of each rib 10 are presented to the operator, and this I accomplish in two ways: First the windowed wall of the barrel B is flattened as indicated at R, Fig. II; and, second, the effective width of the window 9 is relatively great, say two-thirds of the diameter of wheels 4. The width of the window 9 is such that several figures on each wheel 4 lie within the expanse of the window. Thus, over thirty per cent. of the extent of each rib 10 is presented to the hand of the person "setting" the index, and no difficulty is experienced in manipulating the several small wheels 4. An additional feature of my combination lies in the organization of tongues 11, extending in pairs from opposite margins of the window and between successive ribs 10 in the series of index wheels 4. The marginal tongues 11 of each pair terminate at an interval from one another, the interval being such that in adjusted position only one numeral appears on the wheel 4 beneath the pair of tongues. The tongues 11, in addition to their utility, lend a pleasing appearance to the structure in its entirety.

I claim as my invention:

1. A key including a cylindrical barrel in its head portion, a series of index wheels including each a peripheral, outstanding rib located in said cylindrical barrel, the wall of said barrel including a window having marginal tongues extending partway of the width of the window and over the faces of said index wheels and between the successive ribs thereof, said tongues being disposed inwardly of the general cylindrical contour of said barrel, whereby a maximum extent of the ribs on said wheels is presented to the user.

2. A key including a barrel formed in its head portion, a stem extending axially in said barrel, a shoulder integral with one end of said stem, the wall at one end of said barrel being in cross-section formed complementary with said shoulder, whereby said stem is held against rotation and is free for axial movement, a transverse stationary wall at the opposite end of said barrel, a series of index wheels mounted on said stem between said stationary wall and the shoulder on the stem, said index wheels including peripheral, outstanding ribs, means for shifting said stem axially to compress and immovably secure said series of index wheels in the barrel, the wall of said barrel including a window having marginal tongues extending over the faces of said index wheels and between successive ribs outstanding from said series of index wheels.

3. A key including a barrel formed in its head portion, a stem extending axially in said barrel, a shoulder integral with one end of said stem, the wall at one end of said barrel being in cross-section formed complementary with said shoulder, whereby said stem is held against rotation and is free for axial movement, a transverse stationary wall at the opposite end of said barrel, a series of index wheels mounted on said stem between said stationary wall and the shoulder on the stem, said index wheels including peripheral, outstanding ribs, and means for shifting said stem axially to compress and immovably secure said series of index wheels in the barrel.

4. A key for an automobile lock, which key includes a barrel in its head portion, a shouldered stem secured in said barrel against rotation and free for axial movement, a plurality of index wheels rotatably mounted in series upon said stem, said barrel having a rigid end wall constituting a stop, the index wheel at one end of said series being located adjacent the shoulder on said stem, and the index wheel at the opposite end of said series being located adjacent said stop, and means co-operating with said stem for compressing said series of wheels between said stop and shoulder, thereby securing the wheels against rotation.

In testimony whereof I have hereunto set my hand.

EDWEY Z. WAINWRIGHT, Jr.